United States Patent
Rathineswaran et al.

(10) Patent No.: US 10,116,653 B2
(45) Date of Patent: Oct. 30, 2018

(54) SYSTEM AND METHOD FOR SECURING IPMI REMOTE AUTHENTICATED KEY-EXCHANGE PROTOCOL (RAKP) OVER HASH CRACKS

(71) Applicant: American Megatrends, Inc., Norcross, GA (US)

(72) Inventors: Chandrasekar Rathineswaran, Cumming, GA (US); Aruna Venkataraman, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 240 days.

(21) Appl. No.: 15/227,375

(22) Filed: Aug. 3, 2016

(65) Prior Publication Data
US 2018/0041499 A1 Feb. 8, 2018

(51) Int. Cl.
*H04L 29/06* (2006.01)
*G06F 21/46* (2013.01)

(52) U.S. Cl.
CPC .......... *H04L 63/0846* (2013.01); *G06F 21/46* (2013.01); *H04L 63/061* (2013.01)

(58) Field of Classification Search
CPC .................. H04L 63/0846; H04L 63/061
USPC .................................................. 726/6
See application file for complete search history.

(56) References Cited

U.S. PATENT DOCUMENTS

| | | | | | |
|---|---|---|---|---|---|
| 4,800,590 | A | * | 1/1989 | Vaughan | G06F 21/34 235/382 |
| 5,719,941 | A | * | 2/1998 | Swift | G06F 21/31 340/5.54 |
| 5,813,006 | A | * | 9/1998 | Polnerow | H04L 29/06 |
| 7,685,431 | B1 | * | 3/2010 | Mullany | G06F 21/46 713/182 |
| 8,938,569 | B1 | * | 1/2015 | Frangioso | G06F 13/4022 370/381 |
| 9,455,977 | B1 | * | 9/2016 | Bailey | H04L 63/08 |
| 9,754,255 | B1 | * | 9/2017 | Ma | G06Q 20/40 |
| 2002/0083012 | A1 | * | 6/2002 | Bush | G06Q 20/3821 705/76 |
| 2004/0073815 | A1 | * | 4/2004 | Sanai | G06F 21/46 726/6 |

(Continued)

OTHER PUBLICATIONS

Liao, Yi-Pin, and Shuenn-Shyang Wang. "A secure dynamic ID based remote user authentication scheme for multi-server environment." Computer Standards & Interfaces 31.1 (2009): 24-29.*

*Primary Examiner* — Syed A Zaidi
(74) *Attorney, Agent, or Firm* — Locke Lord LLP; Tim Tingkang Xia, Esq.

(57) ABSTRACT

Systems and methods for continuously secure Intelligent Platform Management Interface (IPMI) Remote Authenticated Key-Exchange Protocol (RAKP) over hash cracks. The system includes a management controller, which may receive, from a computing device via a network under the IPMI RAKP protocol, a credential information including a password. In response, the management controller may generate a hash information based on the password, and send the hash information to the computing device. Since the hash information may be used to crack the password, after a time interval from sending the hash information to the computing device, the management controller may change the password to a new password, in order to maintain the security of the password.

20 Claims, 3 Drawing Sheets

(56) References Cited

U.S. PATENT DOCUMENTS

| | | | |
|---|---|---|---|
| 2004/0139331 A1* | 7/2004 | Sanai | G06F 21/36 |
| | | | 713/184 |
| 2007/0100913 A1* | 5/2007 | Sumner | G06F 11/1453 |
| 2008/0219449 A1* | 9/2008 | Ball | G06F 21/80 |
| | | | 380/277 |
| 2009/0150678 A1* | 6/2009 | Li | G06F 21/33 |
| | | | 713/183 |
| 2013/0262642 A1* | 10/2013 | Kutch | H04L 67/125 |
| | | | 709/223 |
| 2014/0373088 A1* | 12/2014 | Aggarwal | G06F 21/46 |
| | | | 726/1 |
| 2016/0292413 A1* | 10/2016 | Williams | G06F 21/31 |
| 2017/0264692 A1* | 9/2017 | Kutch | H04L 67/125 |

* cited by examiner

SYSTEM AND METHOD FOR SECURING IPMI REMOTE AUTHENTICATED KEY-EXCHANGE PROTOCOL (RAKP) OVER HASH CRACKS

FIELD

The present disclosure relates generally to management controller technology, and more particularly to systems and methods for continuously securing Intelligent Platform Management Interface (IPMI) Remote Authenticated Key-Exchange Protocol (RAKP) over hash cracks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A password may be guessed or brute-force cracked. One way to reduce this risk is to store only a cryptographic hash of each password instead of the password itself. RAKP protocol in the IPMI specification is used to generate a keyed-hash message authentication code (HMAC) IPMI password hash. However, the password hash may be grabbed by a hacker and cracked offline.

Therefore, an unaddressed need exists in the art to address the aforementioned deficiencies and inadequacies.

SUMMARY

Certain aspects of the present disclosure relate to a system including a management controller. In certain embodiments, the management controller includes a processor and a non-volatile memory storing computer executable code. The computer executable code, when executed at the processor of the management controller, is configured to: receive, from a computing device via a network under an intelligent platform management interface (IPMI) remote authenticated key-exchange protocol (RAKP), a credential information comprising a password; in response to receiving the credential information, generate a hash information based on the password, and send the hash information to the computing device via the network under the IPMI RAKP; and after a time interval from sending the hash information to the computing device, change the password to a new password.

In certain embodiments, the management controller is a baseboard management controller (BMC).

In certain embodiments, the computer executable code, when executed at the processor of the management controller, is further configured to: reset the time interval when the password is changed.

In certain embodiments, the computer executable code, when executed at the processor of the management controller, is further configured to: send an email comprising the new password to a user. In certain embodiments, the new password is a temporary password, and the email further comprises a request to the user to manually change the temporary password.

In certain embodiments, the computer executable code includes: a data store, configured to store information of rules for generating the new password; an authentication module, configured to receive the credential information from the computing device, generate the hash information, and send the hash information to the computing device; and a password generation module, configured to change the password to the new password by generating the new password based on the rules for generating the new password stored in the data store, and replacing the password with the new password being generated.

In certain embodiments, the computer executable code further includes a time interval determination module, configured to determine the time interval based on a strength of the new password.

In certain embodiments, the strength of the new password is determined by a length of the new password being at least eight characters, including at least one lowercase alphabet, at least one uppercase alphabet, at least one number and at least one American Standard Code for Information Interchange (ASCII) printable symbol.

Certain aspects of the present disclosure relate to a method for secure IPMI RAKP of a management controller. In certain embodiments, the method includes: receiving, by the management controller, a credential information comprising a password from a computing device via a network under an IPMI RAKP; in response to receiving the credential information, generating, by the management controller, a hash information based on the password, and sending the hash information to the computing device via the network under the IPMI RAKP; and after a time interval from sending the hash information to the computing device, changing, by the management controller, the password to a new password.

In certain embodiments, the management controller is a BMC.

In certain embodiments, the method further includes: resetting the time interval if the password is changed.

In certain embodiments, the method further includes: sending, by the management controller, an email comprising the new password to a user. In certain embodiments, the new password is a temporary password, and the email further comprises a request to the user to manually change the temporary password.

In certain embodiments, the management controller stores information of rules for generating the new password, and the password is changed to the new password by: generating the new password based on the rules for generating the new password stored in the data store; and replacing the password with the new password being generated.

In certain embodiments, the time interval is determined based on a strength of the new password.

Certain aspects of the present disclosure relate to a non-transitory computer readable medium storing computer executable code. In certain embodiments, the computer executable code, when executed at a processor of a management controller, is configured to: receive, from a computing device via a network under an IPMI RAKP, a credential information comprising a password; in response to receiving the credential information, generate a hash information based on the password, and send the hash information to the computing device via the network under the IPMI RAKP; and after a time interval from sending the hash information to the computing device, change the password to a new password.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The term "IPMI," as used herein, refers to the Intelligent Platform Management Interface, which is a set of computer interface specifications for an autonomous computer subsystem that provides management and monitoring capabilities independently of the host system's CPU, firmware (BIOS or UEFI) and operating system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In one aspect, the present disclosure provides a method for preventing an IPMI RAKP system from hash cracks continuously be forcing the password to be reset for a given time interval X automatically. The password reset action may generate a new password based on certain predetermined rules, which may be a temporary password to be sent to a registered administrator email, such that the administrator may use the temporary password to log in and change the password manually. In certain embodiments, the time interval X may be determined based on the strength and complexity of the password. For example, the time interval may be determined based on the time required for a brute-force algorithm with current computing power to break the password.

In certain embodiments, the temporary password email may have been lost. To resolve this, a special IPMI original equipment manufacturer (OEM) command (preferably without authentication) can be used to trigger the system to generate a new temporary password, and sending the new temporary password to the administrator registered email. Any other external email services may also be used for triggering the reset without authentication, such as a web user interface (UI) or a RESET application program interface (API), etc.

Figure 1:
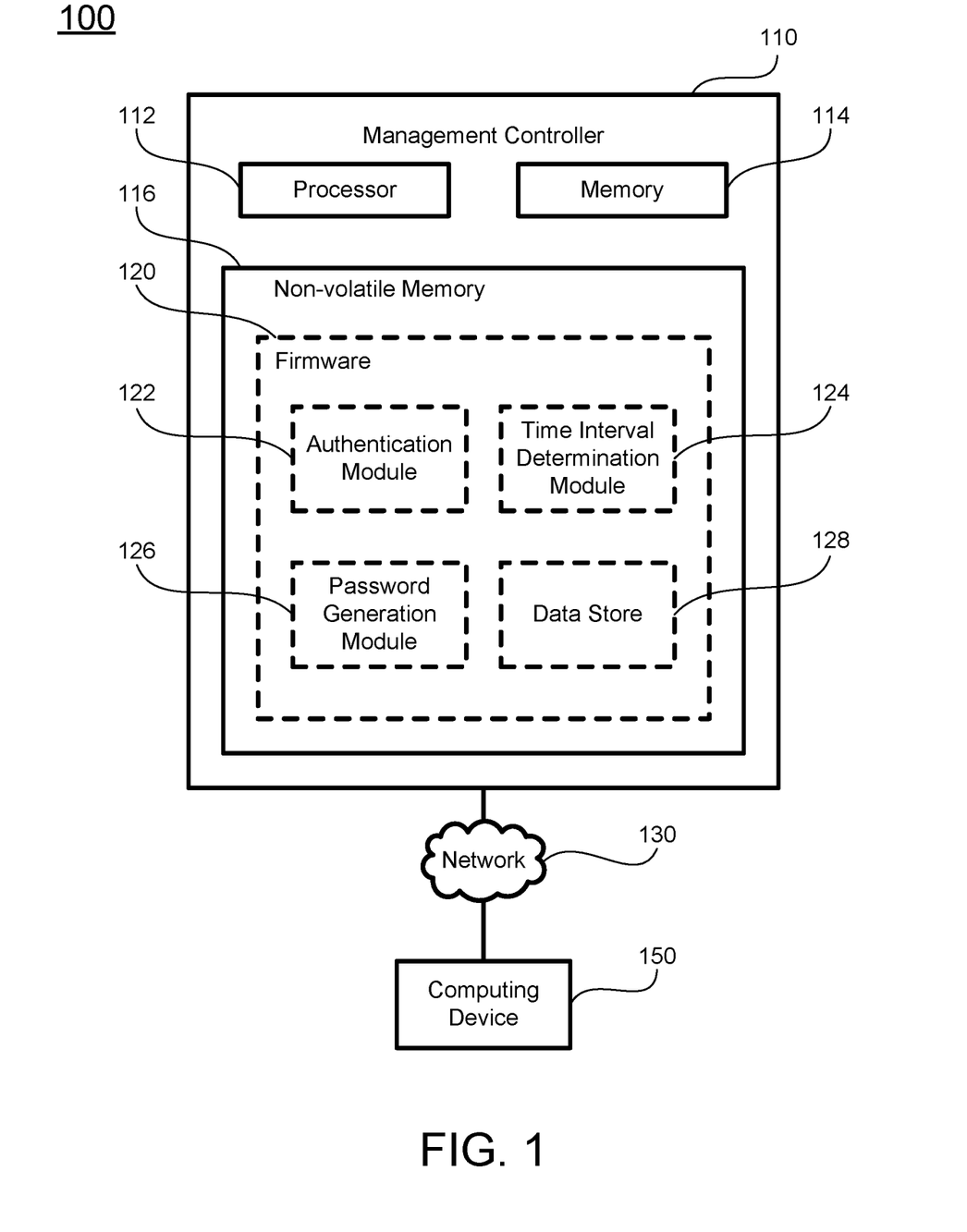
FIG. 1 schematically depicts an exemplary system according to certain embodiments of the present disclosure.

In accordance with the purposes of present disclosure, as embodied and broadly described herein, in certain aspects, the present disclosure relates to a system having a management controller, such as a baseboard management controller (BMC) communicatively connected to a computing device. FIG. 1 schematically depicts an exemplary system according to certain embodiments of the present disclosure. As shown in FIG. 1, a system 100 includes a management controller 110 and a computing device 150. In certain embodiments, the management controller 110 is a BMC. The BMC 110 is connected to the computing device 150 via network 130. In certain embodiments, the network 130 may be a wired or wireless network, and may be of various forms. Examples of the network 130 may include, but is not limited to, a local area network (LAN), a wide area network (WAN) including the Internet, or any other type of networks. The best-known computer network is the Internet.

The BMC 110 is a specialized microcontroller that manages the interface between system management software and platform hardware. In certain embodiments, the BMC 110 may be a service processor (SP). Different types of sensors can be built into a computing device, and the BMC 110 reads these sensors to obtain parameters such as temperature, cooling fan speeds, power status, OS status, etc.

As shown in FIG. 1, the BMC 110 includes a processor 112, a memory 114, and a non-volatile memory 116. In certain embodiments, the BMC 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 controls operation of the BMC 110. In certain embodiments, the processor 112 may be a central processing unit (CPU). The processor 112 may execute any computer executable code or instructions, such as the firmware 120 or other codes stored in the BMC 110. In certain embodiments, the BMC 110 may run on or more than one processor, such as two processors, four processors, eight processors, or any suitable number of processors.

The memory 114 may be a volatile memory, such as the random-access memory (RAM), for storing the data and information during the operation of the BMC 110. In certain embodiments, the memory 114 may be a volatile memory array. In certain embodiments, the BMC 110 may run on more than one memory 114. When the BMC 110 restarts, the contents stored in the memory 114 will be lost.

The non-volatile memory 116 is a non-volatile data storage media or device for storing the computer executable code of the BMC 110. Examples of the non-volatile memory 116 may include flash memory, memory cards, USB drives, or other types of non-volatile storage devices such as hard drives, floppy disks, optical drives, or any other types of data storage devices. In certain embodiments, the BMC 110 may have more than one non-volatile memory 116, and the firmware 120 and other applications of the BMC 110 may be stored in the more than one non-volatile memory 116 separately.

As shown in FIG. 1, the non-volatile memory 116 stores the firmware 120 of the BMC 110. The firmware 120 of the BMC 110 includes computer executable codes for performing the operation of the BMC 110. In certain embodiments, the computer executable code or instructions may collectively form the firmware 120. As shown in FIG. 1, the firmware 120 includes, among other things, an authentication module 122, a time interval determination module 124, a password generation module 126, and a data store module 128. In certain embodiments, each of the modules of the firmware 120 may further include one or more sub-modules. Alternatively, in certain embodiments, some or all of the modules of the firmware 120 may collectively form a single module.

The authentication module 122 is used to construct secure communication between the BMC 110 and the computing device 150. Specifically, a user (such as an administrator of the system 100) may operate the computing device 150 to remotely connect to the BMC 110 via the network 130 under the IPMI RAKP protocol. In certain embodiments, the user may input credential information, which includes a password, in order to log in to the BMC 110. The computing device 150 may then send the credential information to the BMC 110 via the network 130 under the IPMI RAKP protocol. In response to receiving the credential information, the authentication module 122 is configured to generate a hash information based on the password, and send the hash information to the computing device 150, so that a secure communication may be constructed between the BMC 110 and the computing device 150.

The time interval determination module 124 is a module to determine a time interval (X) for resetting the password. In certain embodiments, the time interval determination module 124 may determine value of the time interval X based on the strength and complexity of the password. In certain embodiments, whenever a new password is generated, the strength and complexity of the password may be about the same, and the time interval X may be a predetermined fixed value. Alternatively, in certain embodiments, the strength and complexity of the password may be different, and the time interval X may vary. In certain embodiments, after a new password is manually changed or automatically generated, the time interval determination module 124 may determine the time interval X for the password based on the strength and complexity of the password. If the password is strong (i.e., difficult to crack or break), the determined time interval corresponding to the password may be a long time period. On the other hand, if the password is weak, the determined time interval corresponding to the password may be a short time period. In certain embodiments, the strength and complexity of the password may be determined based on the rules for generating the new password. For example, for a randomly generated password having a length of 8 characters mixed with numbers, symbols and alphabet characters, the time interval may be determined as 15 days, since it may take way more time than 15 days to use a brute-force algorithm with current computing power to break the password. Once the time interval X is determined, a counter may be set whenever the hash information is generated based on the password. For example, if the time interval is determined as 15 days (360 hours), the time interval determination module 124 may set a counter to 360 whenever the hash information is generated based on the password, and subtract 1 from the value of the counter each hour, until the counter becomes zero (meaning 360 hours or 15 days have passed since the has information has been generated). In this case, the time interval determination module 124 may then trigger the password generation module to reset the password.

The password generation module 126 is a module to automatically generate a new password to replace the current password when needed. In certain embodiments, the new password being automatically generated may be a temporary password, which is valid only for a short period of time such that the administrator may use the temporary password to log in, and then manually change the password. In certain embodiments, the password generate module 126 may retrieve, from the data store 128, rules for generating a new password, and then generate the new password based on the retrieved rules. For example, when the time interval X has passed since the hash information was generated and sent to the computing device 150, the password generation module 126 is triggered to generate a new password automatically to replace the old password, so as to improve the safety in case the old password is cracked.

The data store 128 is configured to store information, such as the authentication information, the value of the time interval, and information of the rules for generating a new password and the rules to determine the time interval. In certain embodiments, the rules for generating a new password may include strength parameters of the new password, such as parameters about the password length, whether the new password includes symbols, numbers, lowercase or uppercase characters. For example, the strength of the new password may be determined by a length of the new password being at least eight (8) characters, including at least one lowercase alphabet, at least one uppercase alphabet, at least one number and at least one American Standard Code for Information Interchange (ASCII) printable symbol. In one example, the rules for generating the new password to define such strength of the new password may include generating a random password with a length of 8 characters, which includes 2 uppercase alphabet characters, 2 lowercase alphabet characters, 2 numbers and 2 symbols arranged in a random order. Examples of the random passwords generated under such rules may include "Fs%2u9H&", "$kJ78#Ds" and "3g@XEj^3". In certain embodiments, other specific rules may be added for generating the new password. For example, similar characters (such as straight-line characters including the uppercase letter "I", the lowercase letter "l", the number "1" and the symbols "|" and "!", or circle-shaped characters including the uppercase letter "O", the lowercase letter "o" and the number "0") may be excluded in generating the new password to avoid confusing passwords.

The computing device 150 is a remote computing device communicatively connected to the BMC 110 via the network 130. In certain embodiments, the system 100 may include more than one computing device 150, and each of the one or more computing devices 150 may be respectively connected to the BMC 110 via the network 130. In certain embodiments, the computing device 110 may be a general purpose computer, a specialized computer, a server, a mobile device such as a laptop computer, a smartphone or a tablet, a management controller, a system-on-chip (SOC), or any other types of computing devices. The computing device 150 may include, without being limited to, a processor, a memory, and a storage device. In certain embodiments, the computing device 150 may include other hardware components and software components (not shown) to perform its corresponding tasks. Examples of these hardware and software components may include, but not limited to, other required memory, interfaces, buses, Input/Output (I/O) modules and peripheral devices.

Figure 2:
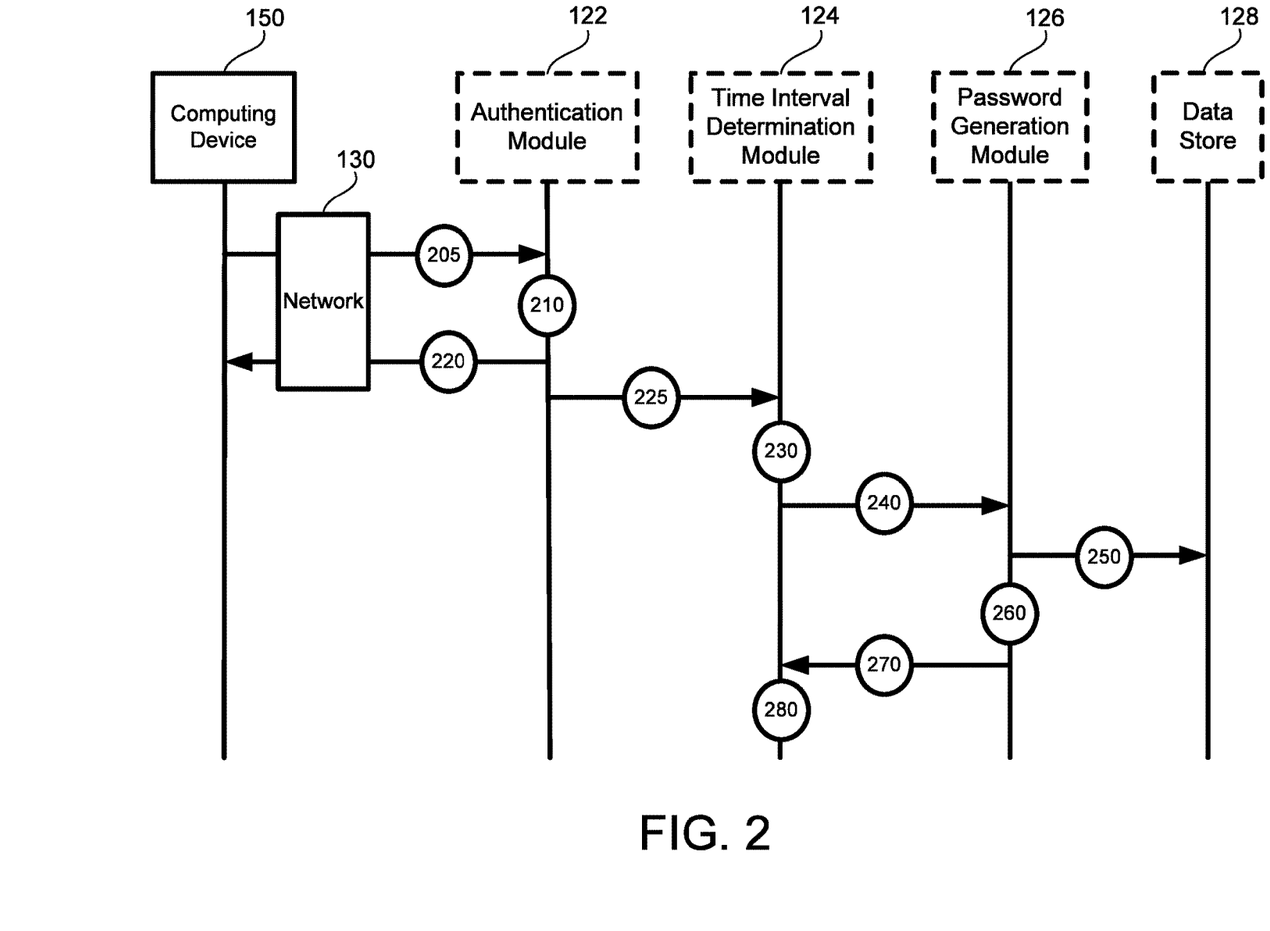
FIG. 2 schematically depicts a secure process according to certain embodiments of the present disclosure.

FIG. 2 schematically depicts a process of achieving continuously secure IPMI RAKP protocol over hash cracks according to certain embodiments of the present disclosure. In certain embodiments, the process as shown in FIG. 2 may be implemented on a system as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at procedure 205, the computing device 150 sends a credential information for a user (e.g., an administrator) to the authentication module 122 of the BMC 110 via the network 130 under the IPMI RAKP protocol. The credential information includes a password for authenticating the authority of the user. In certain embodiments, the credential information may be entered by the administrator or the user on the computing device 150. In other embodiments, the credential information may be generated by an application when the administrator or the user executes the application on the computing device 150.

Upon receiving the credential information from the computing device 150, at procedure 210, the authentication module 122 processes the credential information. In certain embodiments, the password is retrieved from the credential information and compared with the authentication information stored in the data store 128. If the password matches with the authentication information, the credential information is successfully authenticated. If the password does not match any of the authentication information recorded, authentication may fail, and the authentication module 122 terminates the process.

Once the authentication process is passed, at procedure 220, the authentication module 122 generates hash information of the password, and send the hash information to the computing device 150 via the network 130 under the IPMI RAKP protocol, so as to construct a secure communication between the BMC 110 and the computing device 150. It should be noted that the hash information may be hacked and cracked offline. Meanwhile, at procedure 225, the authentication module 122 sends a notification to the time interval determination module 124 in order to start the counter. Upon receiving the notification, at procedure 230, the time interval determination module 124 starts the counter based on the value of the time interval X.

It should be noted that the time interval X may be a fixed time interval, or may be a dynamic time interval determined based on the strength of the password. If the password is a strong password, the time interval may be a long time period; if the password is a weak password, the time interval may be a short time period. The time period is calculated based on how long time it is required for a hacker to crack the hash information if the hack grabs the hash information. As long as the BMC 110 and/or the administrator change the password to a new password before the hacker obtains the password from the hash information, the communication between the BMC 110 and the computing device 150 is secure over hash cracks. In certain embodiments, if the length of time required for cracking the hash information is defined as Tc, the determined time interval Ti is defined as a time equals to or less than the time Tc, that is Ti<=Tc. In certain embodiments, a default time interval $T_0$ is defined in advance. In one embodiment, the default time interval $T_0$ is used as the time interval as long as $T_0$ equals to or less than Tc.

In certain embodiments, at procedure 240, once the counter at the time interval determination module 124 becomes zero (i.e., the time period $T_0$ has passed since the hash information has been generated and sent to the computing device 150), the time interval determination module 124 sends an instruction to the password generation module 126. Upon receiving of the instruction, at procedure 250, the password generation module 126 may retrieve the rules for generating the new password from the data store 128. At procedure 260, the password generation module 126 generates a new password based on the rules retrieved from the data store 128 to replace the current password. In certain embodiments, once the new password is generated, the new password may be sent to a user (e.g., the administrator of the system 100) in an email, such that the user has the new password. In certain embodiments, the new password may be a temporary password, and the email being sent to the user may include a request for the user to change the temporary password.

In certain embodiments, once the new password is generated, the counter may be set back to the time interval X. At procedure 270, the password generation module 126 may send a reset instruction to the time interval determination module 124 when sending out the email in order to set the value of the counter. Upon receiving the reset instruction, at procedure 280, the time interval determination module 280 sets the counter based on the time interval. In certain embodiments, the time interval may be re-determined based on the strength of the new password generated by the password generation module 126.

It should be noted that a user (e.g., an administrator of the system 100) may, at any time during the process, manually change the password. In this case, the time interval may be re-determined based on the new password manually set by the user. Specifically, when the user controls the authentication module 122 to manually change the password, the authentication module 122 may send a reset instruction to the time interval determination module 124. Upon receiving the reset instruction, the time interval determination module 280 sets the counter based on the time interval. In certain embodiments, the time interval may be re-determined based on the strength of the new password manually changed by the user.

Figure 3:
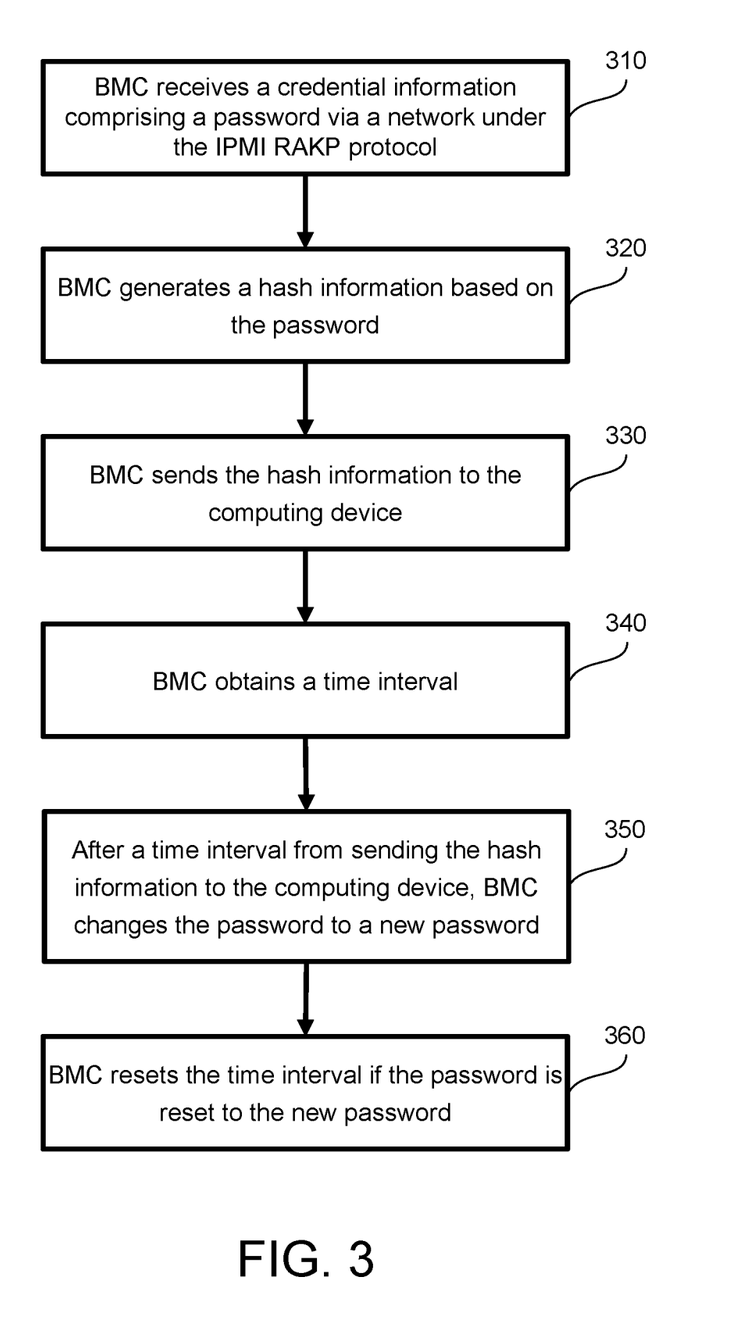
FIG. 3 schematically depicts a flowchart of a method to continuously secure IPMI RAKP protocol over hash cracks according to certain embodiments of the present disclosure.

A further aspect of the present disclosure is directed to a method for secure intelligent platform management interface (IPMI) remote authenticated key-exchange protocol (RAKP) of a management controller. FIG. 3 schematically depicts a flowchart showing a method of continuously secure IPMI RAKP protocol over hash attacks according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 2, at procedure 310, the BMC 110 receives a credential information comprising a password from the computing device 150 via a network 130 under the IPMI RAKP protocol. In certain embodiments, the credential information may be entered by an administrator or a user on the computing device 150 remotely, where the administrator or the user has the authority to perform certain functions on the BMC 110 or via the BMC 110. In certain embodiments, the BMC 110 further includes a network interface for receiving the credential information from the computing device 150 via the network 130. The password information included in the credential information At procedure 320, in response to receiving the credential information, the BMC 110 generates a hash information based on the password. In certain embodiments, the BMC 110 processes the credential information or the password included in the credential information using a hash function, to obtain the hash information. The obtained hash information includes the processed password information. At procedure 330, the BMC 110 sends the hash information to the computing device 150 via the network 130 under the IPMI RAKP protocol, such that a secure communication may be constructed between the BMC 110 and the computing device 150.

At procedure 340, the BMC 110 obtains a time interval. In certain embodiments, a predetermined default time interval is set and stored in the data store 128, and the BMC 110 retrieves the time interval directly from the data store 128. For example, the default time interval may be set as 30 day, or 10 days, or any other time period that is appropriate. In certain embodiments, the time interval X may be dynamically determined based on the strength of the password. The strength of the password may be determined according to a function of the length, the complexity, and the unpredictability of the password. In order to have a strong password, the password may have sufficient length for example at least 12-14 characters if permitted, may include lowercase and uppercase alphabetic characters, numbers and symbols, or any other suitable features. The time interval is calculated based on the strength of the password. For example, if a hacker grabs the hash information, and tries to crack the password offline using the hash information, a time period is required. The determined time interval is defined to be equal to or less than the time period required for a hack to crack the hash information. For example, if it requires about 60 days for the hacker to obtain the password from the hash information, the time interval may be set as 60 days. In other embodiments, the time interval may be set as a time period no longer than the 60 days required to crack the hash information. For example, when the time period required to crack the hash information is about 60 days, the time interval may be set to 15 days, which is 25% of the 60 days. Other values may be used, such as 30 days, 20 days, or 10 days, or any other appropriate time period, based on the security requirements.

At procedure 350, in order to avoid cracking of the password by the hacker using the grabbed hash information, the BMC 110 changes the current password to a new password after the time interval from sending the hash information. In certain embodiments, the procedure 350 is performed by sending a password changing request to the administrator, such that the administrator may change the password accordingly. From this time point, such as the sending of the password changing request, the administrator is unable to use the old password anymore. In certain embodiments, the BMC 110 generate a temporary password having predetermined strength, and sends the generated temporary password to the administrator. The administrator then can use the temporary password to construct communication with the BMC 110 or changing password right away using the temporary password. From this time point, such as the sending of the password changing request, the administrator is unable to use the old password anymore. By this type of design, even if the hacker obtained the password from the hash information, he is not able to construct communication with the BMC 110 after the BMC 110 changes the password.

At procedure 360, after the password has been changed, or the temporary password has been sent, the BMC 110 may reset the time interval. The time interval may be the same as the previous time interval, may be a default time interval, or maybe a time interval that is determined according to the generated temporary password.

As described above, the above procedures may be performed in any order, for example, sequentially, or in parallel, or independent from each other. For example, the generation of the hash information by the procedure 204 and the determination of a time interval by the procedure 340 may be performed independently based on the password information from the received credential information. In certain embodiments, at least one of the procedures is optional.

In another aspect, the present disclosure relates to a non-transitory computer readable medium storing computer executable code. In certain embodiments, the computer executable code may be the firmware stored in the non-volatile memory 116 as described above. The computer executable code, when being executed, may perform one of the methods described above. In certain embodiments, the non-transitory computer readable medium may include, but not limited to, the non-volatile memory 116 of the BMC 110 as described above, or any other storage media of the BMC 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a management controller, comprising a processor and a non-volatile memory storing computer executable code, wherein the computer executable code, when executed at the processor of the management controller, is configured to:
receive, from a computing device via a network under an intelligent platform management interface (IPMI) remote authenticated key-exchange protocol (RAKP), a credential information comprising a password;
in response to receiving the credential information, generate a hash information based on the password, and send the hash information to the computing device via the network under the IPMI RAKP; and
after a time interval from sending the hash information to the computing device, change the password to a new password,
wherein the time interval is determined based on strength parameters of the password, including:
a length of the password;
whether the password includes symbols;
whether the password includes numbers;
whether the password includes lowercase characters; and
whether the password includes uppercase characters.

2. The system of claim 1, wherein the management controller is a baseboard management controller (BMC).

3. The system of claim 1, wherein the computer executable code, when executed at the processor of the management controller, is further configured to:
reset the time interval when the password is changed.

4. The system of claim 1, wherein the computer executable code, when executed at the processor of the management controller, is further configured to:
send an email comprising the new password to a user.

5. The system of claim 4, wherein the new password is a temporary password, and the email further comprises a request to the user to manually change the temporary password.

6. The system of claim 1, wherein the computer executable code comprises:
a data store, configured to store information of rules for generating the new password;
an authentication module, configured to receive the credential information from the computing device, generate the hash information, and send the hash information to the computing device; and
a password generation module, configured to change the password to the new password by generating the new password based on the rules for generating the new password stored in the data store, and replacing the password with the new password being generated.

7. The system of claim 6, wherein the computer executable code further comprises:
a time interval determination module, configured to determine the time interval based on a strength of the new password, wherein the strength of the new password is determined by the strength parameters of the new password.

8. The system of claim 1, wherein the time interval is determined by:
calculating, using the strength parameters of the password, a time period required for a hacker to crack the hash information; and
determining the time interval to be a predetermined fraction of the time period.

9. The system of claim 8, wherein the predetermined fraction is 25%.

10. A method for secure intelligent platform management interface (IPMI) remote authenticated key-exchange protocol (RAKP) of a management controller, comprising:
receiving, by the management controller, a credential information comprising a password from a computing device via a network under an IPMI RAKP; and
in response to receiving the credential information, generating, by the management controller, a hash information based on the password, and sending the hash information to the computing device via the network under the IPMI RAKP; and
after a time interval from sending the hash information to the computing device, changing, by the management controller, the password to a new password,
wherein the time interval is determined based on strength parameters of the password, including:
a length of the password;
whether the password includes symbols;
whether the password includes numbers;
whether the password includes lowercase characters; and
whether the password includes uppercase characters.

11. The method of claim 10, wherein the management controller is a baseboard management controller (BMC).

12. The method of claim 10, further comprising:
resetting the time interval if the password is changed.

13. The method of claim 10, further comprising:
sending, by the management controller, an email comprising the new password to a user.

14. The method of claim 13, wherein the new password is a temporary password, and the email further comprises a request to the user to manually change the temporary password.

15. The method of claim 10, wherein the management controller stores information of rules for generating the new password, and the password is changed to the new password by:
generating the new password based on the rules for generating the new password stored in the data store; and
replacing the password with the new password being generated.

16. The method of claim 10, wherein the time interval is determined based on a strength of the new password, wherein the strength of the new password is determined by the strength parameters of the new password.

17. A non-transitory computer readable medium storing computer executable code, wherein the computer executable code, when executed at a processor of a management controller, is configured to:
receive, from a computing device via a network under an intelligent platform management interface (IPMI) remote authenticated key-exchange protocol (RAKP), a credential information comprising a password;
in response to receiving the credential information, generate a hash information based on the password, and send the hash information to the computing device via the network under the IPMI RAKP; and
after a time interval from sending the hash information to the computing device, change the password to a new password,
wherein the time interval is determined based on strength parameters of the password, including:
a length of the password;
whether the password includes symbols;
whether the password includes numbers;
whether the password includes lowercase characters; and
whether the password includes uppercase characters.

18. The non-transitory computer readable medium of claim 17, wherein the computer executable code, when executed at the processor of the management controller, is further configured to:
reset the time interval when the password is changed.

19. The non-transitory computer readable medium of claim 17, wherein the computer executable code, when executed at the processor of the management controller, is further configured to:
send an email comprising the new password to a user.

20. The non-transitory computer readable medium of claim 19, wherein the new password is a temporary password, and the email further comprises a request to the user to manually change the temporary password.

* * * * *